United States Patent
Ritter et al.

(10) Patent No.: US 7,694,930 B2
(45) Date of Patent: Apr. 13, 2010

(54) CABLE OPERATED SEAT MOUNT LOCKS FOR ROTATABLE VEHICLE SEATS

(75) Inventors: Michael Allen Ritter, Tyler, TX (US); Bobby Leo Woodward, Mabank, TX (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 12/246,115

(22) Filed: Oct. 6, 2008

(65) Prior Publication Data

US 2009/0032669 A1    Feb. 5, 2009

Related U.S. Application Data

(63) Continuation of application No. 11/191,324, filed on Jul. 28, 2005, now Pat. No. 7,451,958.

(51) Int. Cl.
*F16M 13/00* (2006.01)
*B60N 2/02* (2006.01)

(52) U.S. Cl. .................. 248/415; 248/408; 248/425; 296/65.07; 297/344.22; 297/344.11

(58) Field of Classification Search .......... 248/415, 248/418, 651, 655, 162.1, 404, 406.1, 408, 248/425; 297/344.22, 344.1, 344.13, 344.11
See application file for complete search history.

(56) References Cited

U.S. PATENT DOCUMENTS

| | | | | |
|---|---|---|---|---|
| 2,334,193 | A * | 11/1943 | Hedeen et al. | 248/418 |
| 4,058,282 | A * | 11/1977 | Wahls | 248/418 |
| 4,844,543 | A | 7/1989 | Ochiai | |
| 4,884,543 | A | 12/1989 | Stutzenberger | |
| 5,082,328 | A | 1/1992 | Garelick | |
| 5,161,765 | A | 11/1992 | Wilson | |
| 5,882,076 | A | 3/1999 | Garelick et al. | |
| 5,884,887 | A | 3/1999 | Garelick et al. | |
| 6,012,775 | A | 1/2000 | Czarnecki | |
| 6,079,786 | A | 6/2000 | Kirkland et al. | |
| 6,116,183 | A * | 9/2000 | Crow et al. | 114/363 |
| 6,877,811 | B1 | 4/2005 | Garelick | |
| 7,303,236 | B2 * | 12/2007 | Ritter et al. | 297/344.11 |
| 7,364,234 | B2 * | 4/2008 | Begin et al. | 297/344.22 |
| 7,490,905 | B2 * | 2/2009 | Ritter et al. | 297/344.11 |
| 2006/0144315 | A1 | 7/2006 | Garelick | |

OTHER PUBLICATIONS

Office Action, issued by the United States Patent and Trademark Office on Aug. 2, 2007, in connection with U.S. Appl. No. 11/191,324, 9 pages.

(Continued)

*Primary Examiner*—Anita M King
(74) *Attorney, Agent, or Firm*—Hanley, Flight & Zimmerman, LLC (57) ABSTRACT

Apparatus for operation of a vehicle seat swivel or rotation mechanism are disclosed. A disclosed apparatus includes a cable assembly having a first end and a second end. The first end of the cable assembly is configured to be operatively coupled to a rotation mechanism of a vehicle seat. A release member is operatively coupled to the second end of the cable assembly so that the rotation mechanism is urged toward a locked condition in the absence of a force being applied to the release member by a person.

12 Claims, 6 Drawing Sheets

OTHER PUBLICATIONS

Office Action, issued by the United States Patent and Trademark Office on Mar. 20, 2008, in connection with U.S. Appl. No. 11/191,324, 7 pages.

Notice of Allowance and Fee(s) Due, issued by the United States Patent and Trademark Office on Jul. 14, 2008, in connection with U.S. Appl. No. 11/191,324, pp. 4.

* cited by examiner

CABLE OPERATED SEAT MOUNT LOCKS FOR ROTATABLE VEHICLE SEATS

CROSS REFERENCE TO RELATED APPLICATION

This application is a continuation of U.S. patent application Ser. No. 11/191,324, entitled "Cable Operated Seat Mount Locks for Rotatable Vehicle Seats," filed Jul. 28, 2005, and incorporated herein by reference in its entirety.

FIELD OF THE DISCLOSURE

The present disclosure relates generally to vehicle seats and, more specifically, to cable operated seat mount locks for rotatable vehicle seats.

BACKGROUND

Many vehicle seats such as those used in boats include a swiveling or rotatable seat mount coupled to a post and base assembly in the boat. A swiveling or rotatable seat mount enables a seated vehicle occupant to rotate their seat to a desired position, which typically occurs when the vehicle is relatively stationary to enable, for example, an operator of the vehicle (e.g., a driver) to adjust the position of their seat for use of vehicle controls, comfort, safety, etc.

Typically, vehicle seat swivel or rotation mechanisms are operated via a lever or other similar mechanical member that is directly or rigidly coupled to the rotatable seat mount. Additionally, the lever or other member for operating the seat swivel or rotation mechanism is typically located in close proximity to the seat and its swivel or rotation mechanism so that a seated vehicle occupant can easily operate the rotation mechanism. For example, in the case of boats, a lever for operating (e.g., locking/unlocking) the seat swivel or rotation mechanism is often located near the right or left side of the seat bottom.

The above-noted direct and proximate relationship between the rotation mechanism control (e.g., lever) results in a relatively low overall seat cost and provides a relatively high degree of occupant safety. In particular, such known mechanical rotation controls use relatively few parts that are unlikely to bind, seize, or otherwise impede the return of the rotation mechanism to a locked condition following an adjustment by the occupant. Leaving a seat in an unlocked condition is unsafe for operation of the vehicle and could, for example, significantly increase the likelihood of injury to an occupant during an accident (e.g., a collision).

Unfortunately, in the case of boats, for example, some seat pedestals or mounting posts are relatively short (e.g., less than eight inches), which may significantly limit the permissible length of the operating lever for the swivel or rotational locking mechanism. In particular, a lever that extends near to the outer edge of the seat bottom is easier for a seat occupant to reach and operate. However, a longer lever requires more vertical space in which to actuate and travel. As a result, for those seats having relatively short mounting posts or pedestals, a lever that operates (i.e., unlocks the locking mechanism) when moved downward must be made relatively shorter and, thus, may have to be disposed substantially inward from the edge of the seat bottom making it more difficult for the seat occupant to reach and operate the lever.

In the case of an operating lever that operates (i.e., unlocks the locking mechanism) when moved upward, the lever must be made short enough to ensure that the free end (i.e., the end actuated by the seat occupant) of the lever does not contact the seat bottom before the unlocked condition is achieved, which would prevent unlocking of the swivel or rotational mechanism.

DETAILED DESCRIPTION

In general, the example seat swivel or rotation mechanism described herein enables a single seat rotation mechanism to be used for a wide variety of vehicle seat designs and layouts. More specifically, the example seat rotation mechanism described herein is operated via a flexible coupling such as, for example, a cable assembly or the like so that an operating lever, control lever, knob, or other control member that a vehicle occupant uses to unlock/lock the rotation mechanism to adjust the seat can be located in a variety of locations without requiring different rotation mechanism and control lever designs and also without affecting the design of the pedestal on which the vehicle seat is mounted.

More specifically, the example seat rotation mechanism described herein provides an unlocked condition in which a vehicle seat can be rotatably adjusted about, for example, an axis of rotation (e.g., the longitudinal axis of a pedestal or other seat mount) by an occupant of the seat or other person and a locked condition in which the vehicle seat is fixed (i.e., substantially immovable) about the axis of rotation. The example seat rotation mechanism described herein uses a locking member or pin that is springably biased (e.g., using a spring or other resilient member) so that the seat rotation mechanism is urged toward the locked condition in the absence of a force being applied to the operating lever, control knob, etc. by the seat occupant or other person. To unlock the seat rotation mechanism, the seat occupant or other person applies a force to (e.g., pulls, pushes, etc.) the operating lever, which conveys a force via the cable assembly or other flexible coupling to the locking pin to overcome the bias and urge the locking pin away from the locked condition. When the seat occupant or other person ceases to apply force to the operating lever, the springably biased locking member or pin automatically returns to the locked condition.

In an example seat rotation mechanism, the locking pin is biased using a bias element such as a spring that is operatively coupled to the locking pin. Alternatively or additionally, a bias element or spring can be operatively coupled to the operating lever to provide a force via the flexible coupling or cable assembly that urges the locking pin toward the locked condition. In the case where multiple bias elements or springs are used, an added measure of safety is provided because the failure of one bias element or spring will not inhibit or prevent the locking pin and, thus, the seat rotation mechanism from returning to the locked condition.

Figure 1:
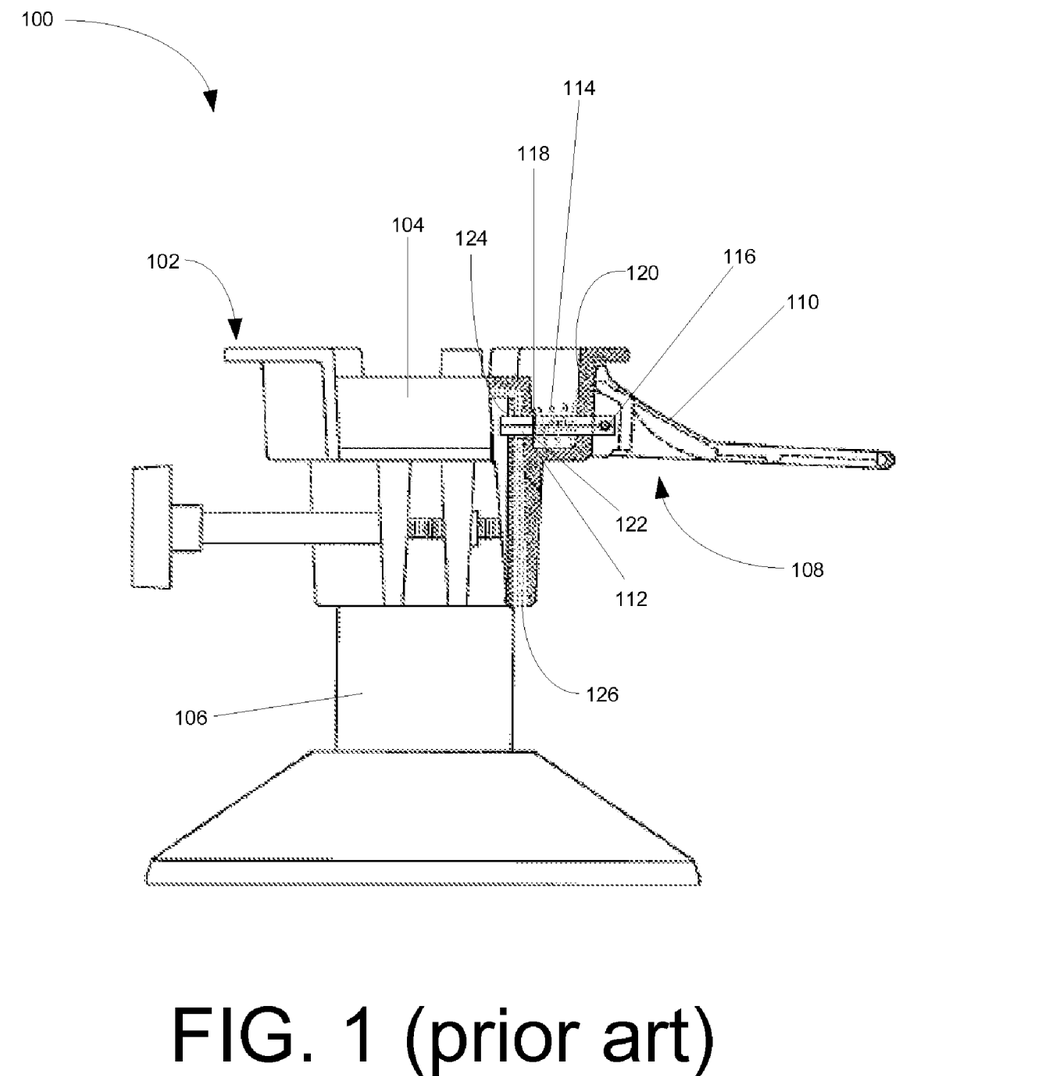
FIG. 1 depicts known a vehicle seat mounting assembly partially in cross-section depicting an operating lever of a rotational seat mount in a locked position.

FIG. 1 illustrates a conventional vehicle seat support assembly 100 including a conventional seat rotation mechanism 102 that further includes a seat mount 104, which is configured to receive and support a vehicle seat (not shown). The seat mount 104 is coupled to a mounting base or pedestal 106 which, in turn, may be coupled or fixed to a floor surface of a vehicle (not shown) such as, for example, a boat. The rotation mechanism 102 also includes a locking mechanism 108, which is shown in a locked position. The locking mechanism 108 includes an operating handle or lever 110, a locking pin 112 and a spring member 114. The locking pin 112 is rotatably or pivotally coupled to the lever 110 via a pin or other suitable coupling 116. Additionally, the spring 114 is configured to springably drive against a spring retainer 118, which is fixed relative to the locking pin 114, and a wall 120 of the seat mount 104. In this manner, the locking mechanism 108 is springably biased and held in the locked condition depicted in FIG. 1. As is shown in FIG. 1, in the locked condition, the locking pin 114 passes through an aperture 122 in the seat mount 104 that is aligned with an aperture 124 in the base 106. With the locking pin 114 passing though both apertures 122 and 124, the seat mount 104 is prevented from rotating relative to the base 106.

Figure 2:
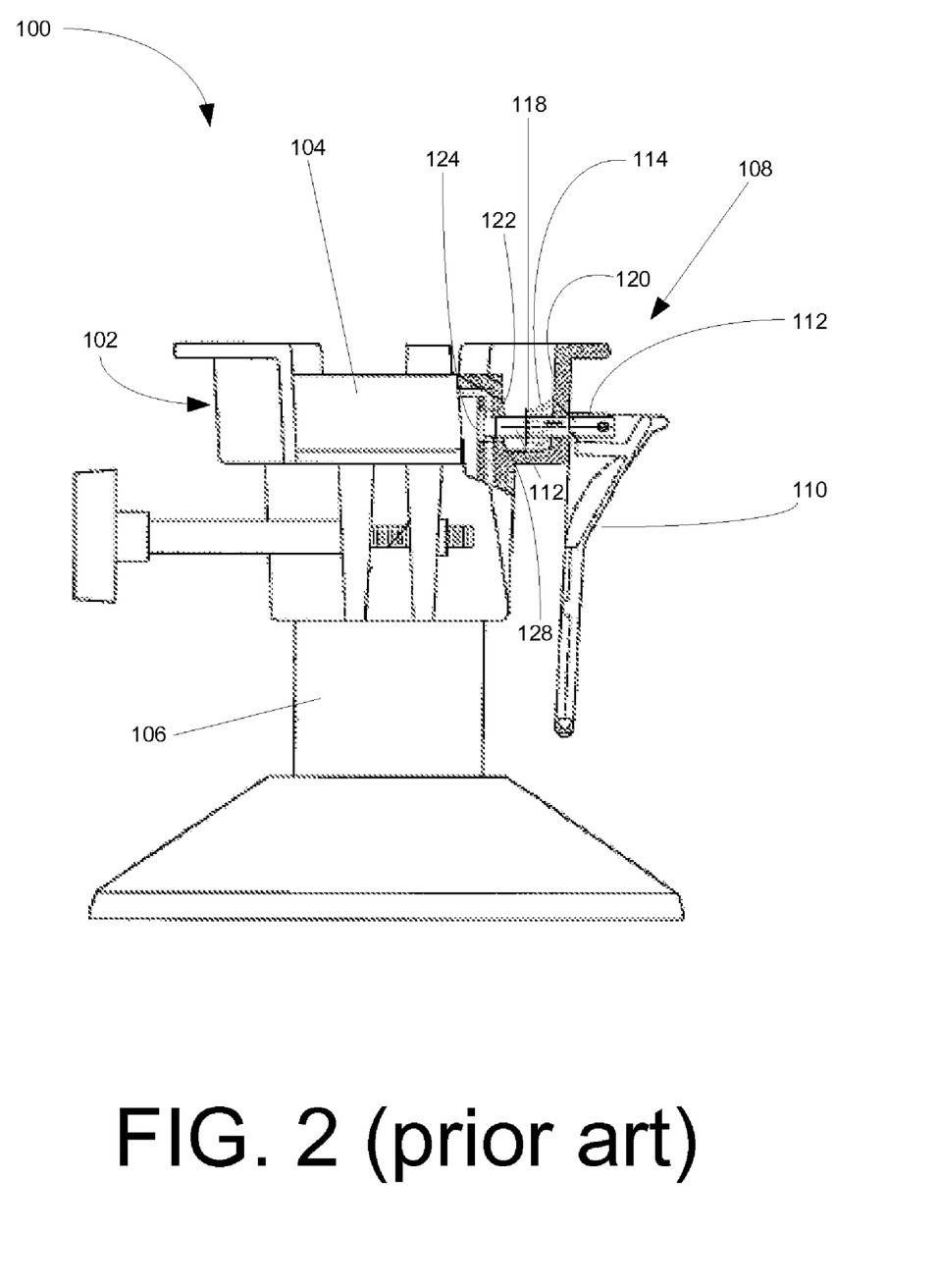
FIG. 2 depicts the known vehicle seat mounting assembly of FIG. 1 with the operating lever in an unlocked position.

FIG. 2 shows the lock operating handle or lever 110 of the seat rotation mechanism 102 in an unlocked position, which enables the seat mount 104 and, thus, any seated mounted thereto to be rotated relative to the mounting base 106. More specifically, to unlock the seat rotation mechanism 102, the operating handle or lever 110 is pushed downwards, as depicted in FIG. 2. With the handle or lever 110 in the position shown in FIG. 2, the locking pin 112 is withdrawn from the apertures 122 and 124, thereby enabling the seat mount 104 to rotate relative to the base 106. Additionally, with the handle or lever 110 in the downward position, the spring retainer 118 is moved nearer to the wall 120 to further compress the spring 114.

Figure 3:
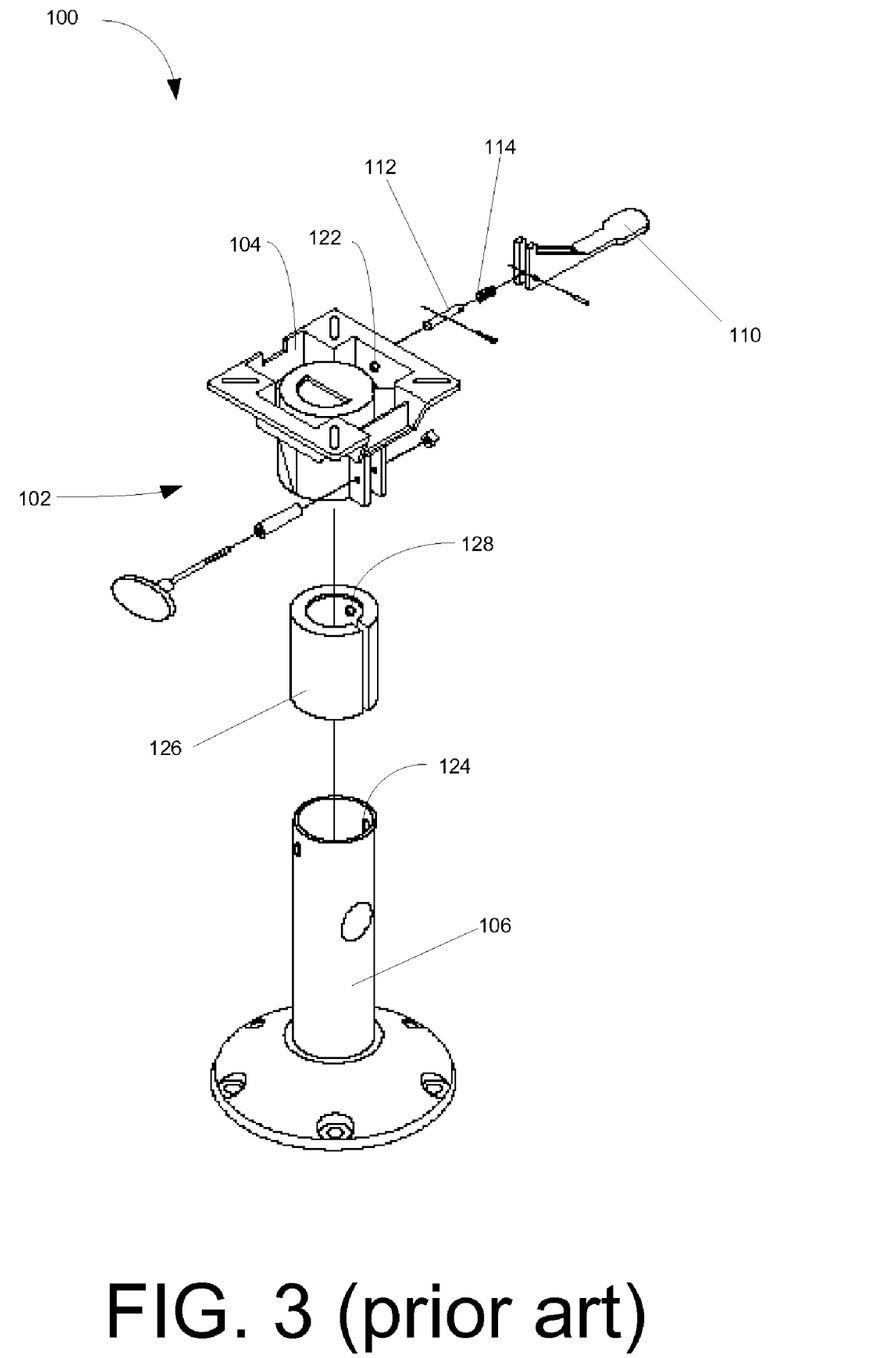
FIG. 3 is an exploded assembly view of the known boat pedestal and rotatable seat mount of FIGS. 1 and 2.

FIG. 3 is an exploded assembly view of the known boat pedestal and rotatable seat mount of FIGS. 1 and 2. As shown in FIG. 3, the seat mount 104 is coupled to the base 106 via a seat mount bushing 126. The bushing 126 also includes an aperture 128 that is positioned and sized to be aligned with the apertures 122 and 124 so that, in the locked position, the locking pin 112 passes through each of the apertures 122, 124, and 128.

Figure 4:
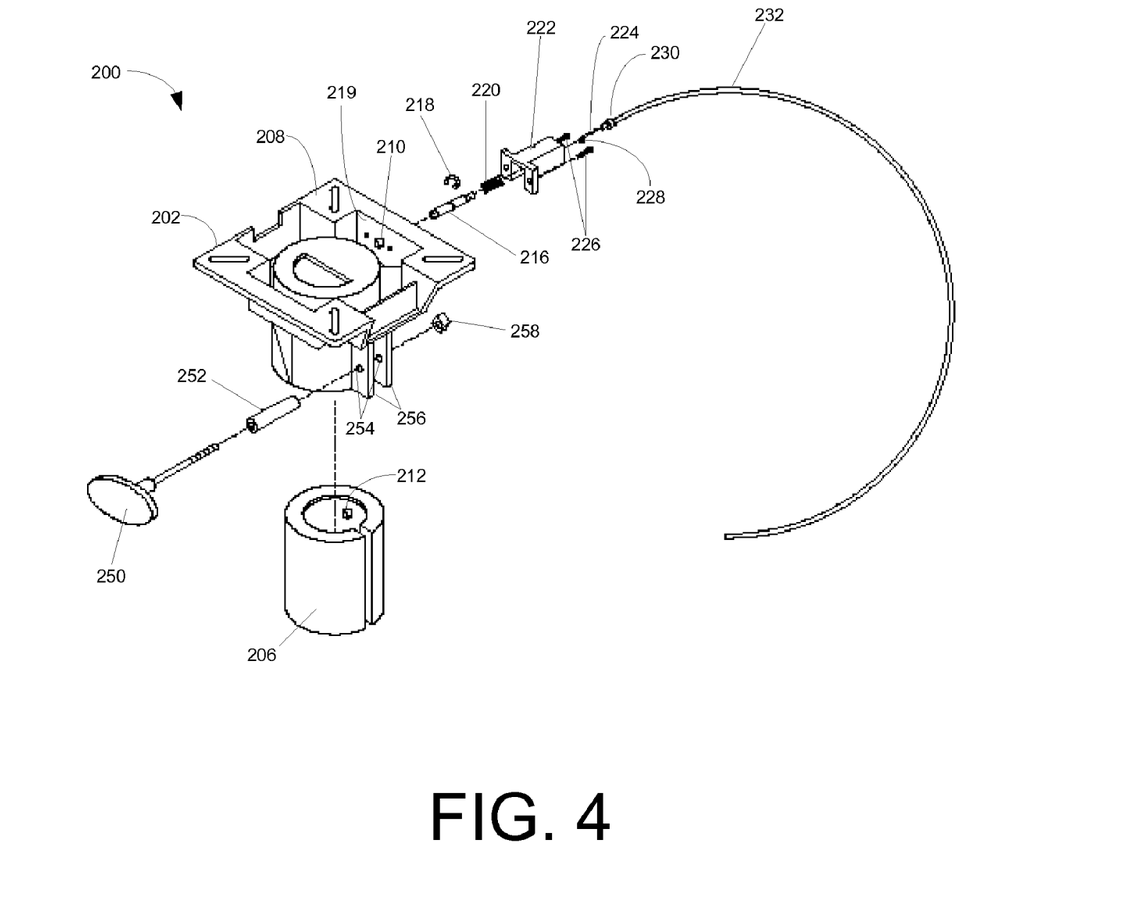
FIG. 4 is an exploded assembly view of an example seat swivel or rotation mechanism described herein.
Figure 5:
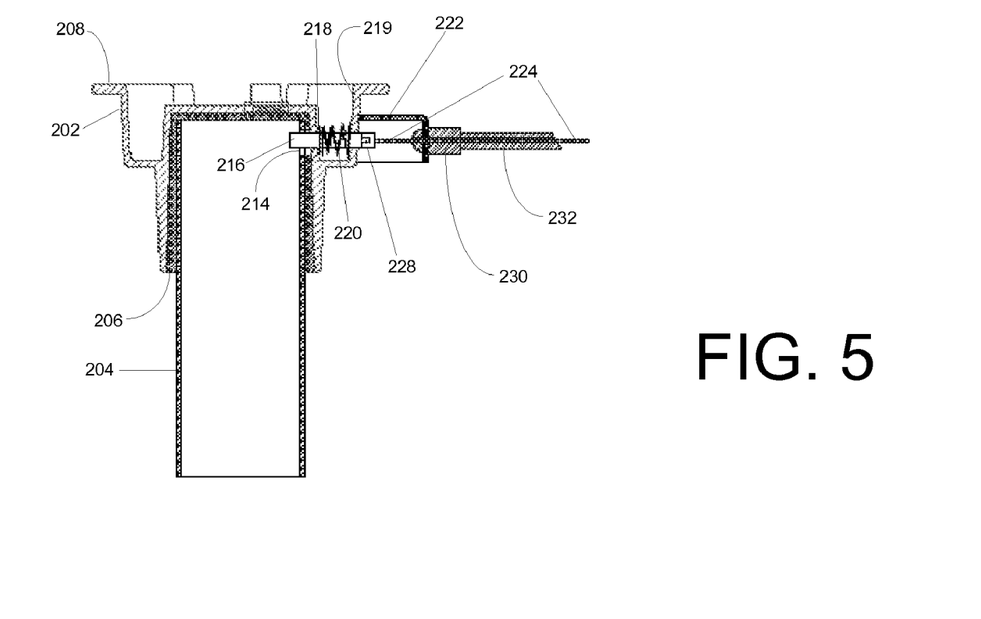
FIG. 5 is a detailed cross-sectional view of the example seat swivel or rotation mechanism of FIG. 4 in a locked condition.
Figure 6:
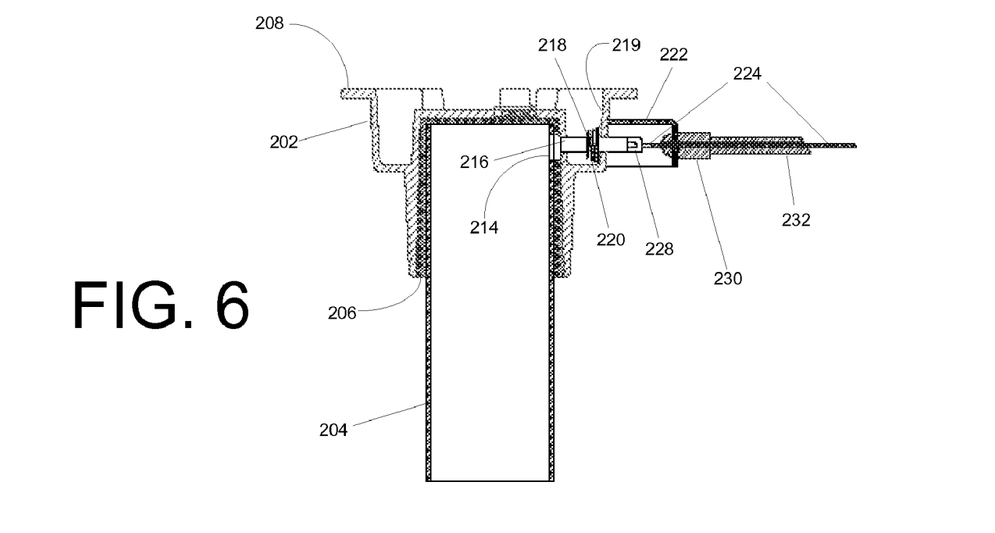
FIG. 6 is a detailed cross-sectional view of the example seat swivel or rotation mechanism of FIG. 4 in an unlocked condition.

FIGS. 4-6 illustrate an example seat rotation mechanism 200 having a cable operated locking mechanism. The example seat rotation mechanism 200 includes a seat mount 202 that is configured to be rotatably coupled to a stationary seat mount or pedestal base 204 via a bushing 206. A vehicle seat (not shown) may be coupled or mounted to a surface 208 of the seat mount 202.

The mount 202, the bushing 206, and the base 204 include respective openings or apertures 210, 212, and 214. As shown in FIG. 5, the apertures 210, 212, and 214 are configured to be aligned to receive a locking pin 216. When the locking pin 216 passes through the apertures or openings 210, 212, and 214, the mount 202 and, thus, any seat mounted thereto, is immovable (i.e., cannot be rotated) relative to the base 204.

Coupled to the surface of the locking pin 216 is a spring retainer 218, such as an "E" clip spring retainer, which captures or holds a spring 220 between the retainer 218 and an inner surface 219 of the seat mount 202. Of course, the spring retainer 218 could be implemented using any other suitable retaining mechanism such as a circlip, lock washer, push nut, etc. Attached to the exterior of the seat mount 202 is an adaptor housing 222 through which a cable 224 runs. The adaptor housing 222 is coupled to the seat mount 202 via screws 226 or any other suitable fastening mechanism. The cable 224 is attached to the locking pin 216 via a cable-to-lock pin adaptor 228. The cable 224 runs from the cable-to-lock pin adaptor 228 to a cable/housing adaptor 230 and into and through an outer sheath 232, which surrounds at least a portion of the cable 224.

To unlock the seat rotation mechanism 200, (i.e., so that the mount 202 is movable or rotatable relative to the base 204) the locking pin 216 is withdrawn from the apertures 210, 212, and 214 as shown in FIG. 6. In operation, to unlock the seat rotation mechanism 200, the cable 224 is pulled or drawn away from the mount 202 to cause the locking pin 216 to withdraw out of the apertures 210, 212, and 214 into the adaptor housing 222. As the locking pin 216 is withdrawn in this manner, the spring 220 is further compressed and the locking pin 216 is clear of the apertures 210, 212, and 214, thereby enabling the mount 202 to be moved (i.e., rotated) relative to the base 204.

Figure 7:
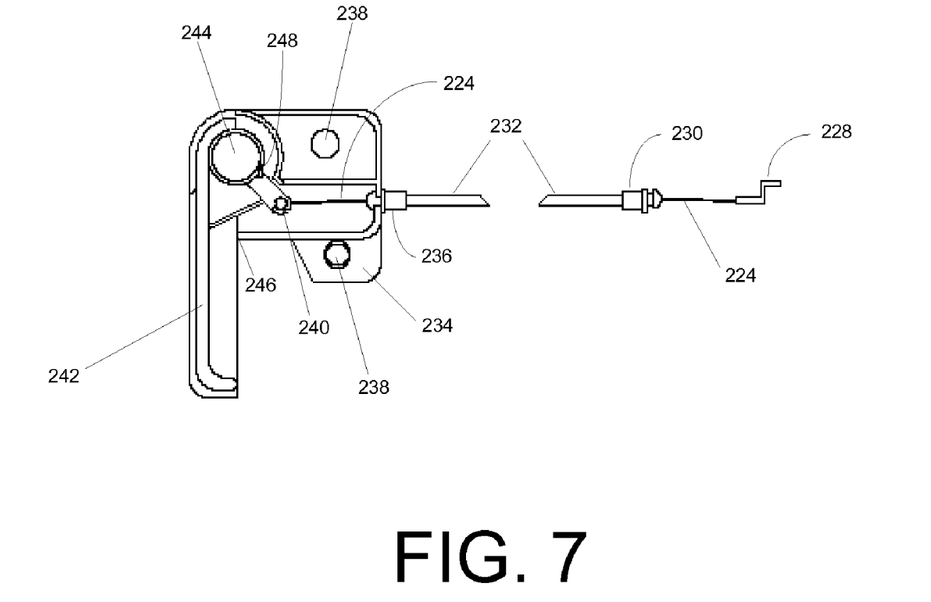
FIG. 7 illustrates an example operating lever that may be used with the example seat swivel or rotation mechanism described herein where the lever is in a locked position.
Figure 8:
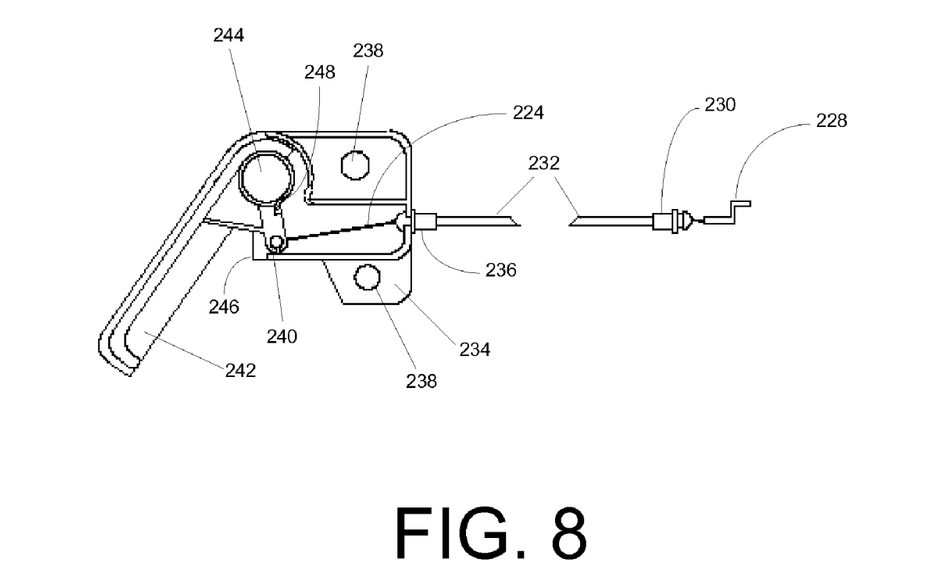
FIG. 8 illustrates the example operating lever of FIG. 7 in an unlocked position.

As illustrated in FIGS. 7 and 8, the outer sheath 232 and the cable 224 extend to a handle mount 234, at which the sheath 232 is coupled to the handle mount 234 via a cable-mount connector 236 (e.g., a ferrel). The handle mount 234 can be coupled or mounted to a seat frame (not shown) or any other desired location within a vehicle by mechanical fasteners (not shown) that are passed through mounting holes 238. The handle mount 234 may alternatively or additionally be coupled via chemical fasteners (e.g., adhesives). The cable 224 passes through the cable-mount connector 236 into the handle mount 234, and is coupled to an extension 240 on a handle, operating, release or control lever 242.

In the locked position shown in FIG. 7, the cable 224 is pulled away from the operating lever 242 and toward the seat mount 202. The cable 224 pulls the extension 240 and causes the operating lever 242 to move toward the handle mount 234 about a pivot point 244. The operating lever 242 approaches the handle mount 234 until the lever 242 reaches a handle stop 246. With the operating lever 242 in contact with the handle stop 246, the pin 216 penetrates the base 204 via the apertures 210, 212, and 214 (see FIG. 5) and the seat rotation mechanism 200 is locked (i.e., the seat mount 202 is prevented from rotating relative to the base 204).

In the unlocked position shown in FIG. 8, a user manually pulls the operating lever 242 outward (i.e., away from the handle mount 234). As the lever 242 is pulled outward, the lever 242 rotates about the pivot point 244 and pulls the extension 240 to draw or pull the cable 224 toward the handle mount 234. As the cable 224 is drawn toward the handle mount 234, the locking pin 216 is drawn or pulled out of the apertures 210, 212, and 214, as described above, which enables the seat mount 202 (and any seat attached thereto) to be rotated relative to the base 204.

When the example seat rotation mechanism 200 is in the unlocked position (FIGS. 6 and 8), the spring 220 is compressed and exerts a force opposite the force exerted by the user on the operating lever 242. Additionally, the operating lever 242 is coupled to a torsion spring 248 that also applies a return force to the operating lever 242. Thus, the springs 220 and 242 bias the locking pin 216 toward the locked position (FIG. 5), which ensures that without user involvement (i.e., when the user ceases to manually exert a force on the operating lever 242), the seat rotation mechanism 200 will be locked, which increases safety for the user by decreasing the likelihood that the seat will rotate unintentionally and undesirably. Further, the use of two springs or, more generally, a plurality of springs, provides an added measure of safety in the event that one of the springs 220 and 242 is impeded or otherwise fails.

The example seat rotation mechanism 200 may have additional features such as a friction control knob 250 as shown in FIG. 4. The friction control knob 250 is threaded through a spacer 252 and through holes 254 in flanges 256 of the seat mount 202 and is secured with a friction control nut 258. As the friction control knob 250 is rotated in a manner to increase friction, the flanges 256 of the seat mount 202 are forced closer together, which causes the inner diameter of the seat mount 202 to decrease and, thus, increases friction between the seat mount 202 and the bushing 206. Increased friction between the seat mount 202 and the bushing 206 decreases the ease with which the seat mount 202 can be rotated relative to the base 204. To decrease the friction and increase the ease with which the seat mount 202 can be rotated relative to the base 206, the friction control knob 250 is turned in a direction opposite that described above, which allows the flanges 256 to move apart and increases the inner diameter of the seat mount 202.

The seat rotation mechanism 200 may be configured (e.g., sized, shaped, utilizes materials, etc.) for any particular vehicle seat for any type of vehicles including, for example, a boat, a car, a recreational vehicle, heavy equipment, etc. Further, the outer sheath 232 and the ability of the handle mount 234 to be variably located throughout the vehicle enables the seat rotation mechanism 200 described herein to accommodate a particular vehicle and/or vehicle seat configuration, a preference of the vehicle owner, etc. In this manner, a single configuration of the example seat rotation mechanism 200 can be used with a wide variety of vehicle seats, vehicle seat arrangements, vehicle configurations, etc.

Although certain apparatus have been described herein, the scope of coverage of this patent is not limited thereto. To the contrary, this patent covers all apparatus fairly falling within the scope of the appended claims either literally or under the doctrine of equivalents.

What is claimed is:

1. An apparatus for rotating a vehicle seat, comprising:
    a seat mount configured to be operatively coupled to the vehicle seat;
    a generally tubular pedestal base rotatably coupled to the seat mount, the pedestal base having at least one detent on an outer surface thereof;
    a locking mechanism including at least one surface configured to releasably engage the at least one detent to provide a locked condition in which relative movement between the seat mount and the pedestal base is substantially prohibited and an unlocked condition in which relative movement between the seat mount and the pedestal base is permitted;
    an operating lever;
    a substantially flexible coupling having a proximal end and a distal end and operatively coupled to the locking mechanism at the proximal end and the operating lever at the distal end, wherein a force applied to the operating lever urges the locking mechanism toward the unlocked condition; and
    a bias member coupled to the operating lever at the distal end of the flexible coupling to urge the locking mechanism to the locked condition.

2. An apparatus as defined in claim 1, wherein the at least one detent is an aperture extending through the outer surface of the pedestal base.

3. An apparatus as defined in claim 1, wherein the seat mount further comprises a generally tubular projection extending therefrom and configured to be operatively coupled over an end of the pedestal base.

4. An apparatus as defined in claim 3, wherein the generally tubular projection includes at least one aperture sized to allow the locking mechanism to extend there through.

5. An apparatus as defined in claim 3, wherein an inner diameter of the generally tubular projection is adjustable in size.

6. An apparatus as defined in claim 1, further comprising a bushing configured to rotatably couple the seat mount and the pedestal base.

7. An apparatus as defined in claim 1, further comprising an adapter housing coupled to the seat mount, wherein adapter housing is adapted to support the substantially flexible coupling and the locking mechanism.

8. An apparatus as defined in claim 1, wherein the operating member is rotatable about a pivot.

9. An apparatus as defined in claim 8, wherein the bias member surrounds the pivot.

10. An apparatus as defined in claim 8, wherein a rotational movement of the operating member causes a linear movement of the locking mechanism.

11. An apparatus as defined in claim 1, wherein the bias member is a torsion spring.

12. An apparatus as defined in claim 1, further comprising a friction control knob configured to change an amount of friction between the seat mount and the base.

\* \* \* \* \*